United States Patent

[11] 3,571,713

[72] Inventor James D. Zachary
49 Hillcrest Ave, Stamford, Conn. 06902
[21] Appl. No. 732,463
[22] Filed May 27, 1968
[45] Patented Mar. 23, 1971

[54] LOW FREQUENCY WIDE BAND FM DEMODULATORS
10 Claims, 5 Drawing Figs.

[52] U.S. Cl. .......... 325/349, 325/487
[51] Int. Cl. .......... H04b 1/28
[50] Field of Search .......... 325/349, 487, 489, 47, 48; 329/129, 103, 110, 141

[56] References Cited

UNITED STATES PATENTS 3,290,608 12/1966 Gschwandtner .......... 329/103
3,355,669 11/1967 Avins .......... 329/103
3,462,694 8/1969 Avins .......... 329/110

*Primary Examiner*—Robert L. Griffin
*Assistant Examiner*—Kenneth W. Weinstein
*Attorney*—Blair, Buckles, Cesari and St. Onge

ABSTRACT: The disclosure concerns a demodulator for demodulating frequency modulated subcarriers. The demodulator is used in combination with a conventional FM receiver detector and is designed to demodulate SCA broadcasts. The SCA intelligence is introduced as FM signals to the modulator of an FM transmitter along with normal audiofrequency intelligence. The demodulator, connected to the output of the FM receiver detector, converts the FM intelligence of the SCA broadcast to audiofrequency intelligence using a two-stage active band-pass filter network and a ratio detector. The components of the demodulator are mounted on a printed circuit board in a manner to achieve compact size and a low profile.

INVENTOR.
James D. Zachary
BY
Blair, Buckles, Cesari & St. Onge
ATTORNEYS.

INVENTOR.
James D. Zachary
BY
Blair, Buckles, Cesari & St. Onge
ATTORNEYS.

LOW FREQUENCY WIDE BAND FM DEMODULATORS

BACKGROUND OF THE INVENTION

Congestion of the radio airways is fast becoming an acute problem. This is particularly so in large metropolitan areas where the public demands a wide variety of radio programming. As a result, more and more FM stations are coming on the air. FM broadcasting, because of the wide bandwidth allotted to each station, can and is providing for more versatile programming. By virtue of the wide modulation deviation permitted in FM broadcasting—sufficiently wide to accommodate the entire audiofrequency spectrum several times over—high fidelity broadcasting is made possible. In fact FM stations have gone to stereo programming. This has been particularly satisfying to hi-fi buffs and music connoisseurs.

In addition to main program intelligence and stereo program intelligence, FM stations have begun to also broadcast intelligence using subcarriers ranging from 24 kc. to 67 kc. This broadcasting has been termed Subsidiary Carrier Authorization (SCA). Some stations broadcast several SCA programs simultaneously. The intelligence is impressed in FM form on the modulator of the FM transmitter; it having been previously converted from audiofrequency intelligence to FM intelligence. Thus, the intelligence is actually broadcast as FM of an FM subcarrier. In the normal FM receiver the broadcast is demodulated, but this leaves the SCA intelligence unintelligible until it is converted to audio intelligence. This requires a second demodulator or detector which is the subject of the instant invention.

SUMMARY OF THE INVENTION

According to the present invention, there is provided an FM demodulator which is of simplified design and construction. It is conducive to printed board construction, thus achieving extremely small land compact size, ruggedness and reliability. My demodulator is particularly suited for incorporation into existing FM receivers without modification, thus increasing program reception capabilities.

The demodulator of my invention consists simply of a two-stage active band-pass filter network and a ratio detector. Interstage coupling transformers have horizontally arranged primary and secondary coils coupled in air; the spacings therebetween being manually adjusted for proper coupling. The whole circuit is then potted in epoxy to preserve the established spacing. This construction provides an extremely low profile module which can be readily incorporated into existing FM receivers.

The invention accordingly comprises the features of construction, combinations of elements, and arrangement of parts which will be exemplified in the constructions hereinafter set forth, and the scope of the invention will be indicated in the claims.

For a fuller understanding of the nature of the invention, reference should be had to the following detailed description taken in connection with the accompanying drawings in which.

Like reference numerals refer to like parts throughout the several views of the drawings.

DETAILED DESCRIPTION

Figure 1:
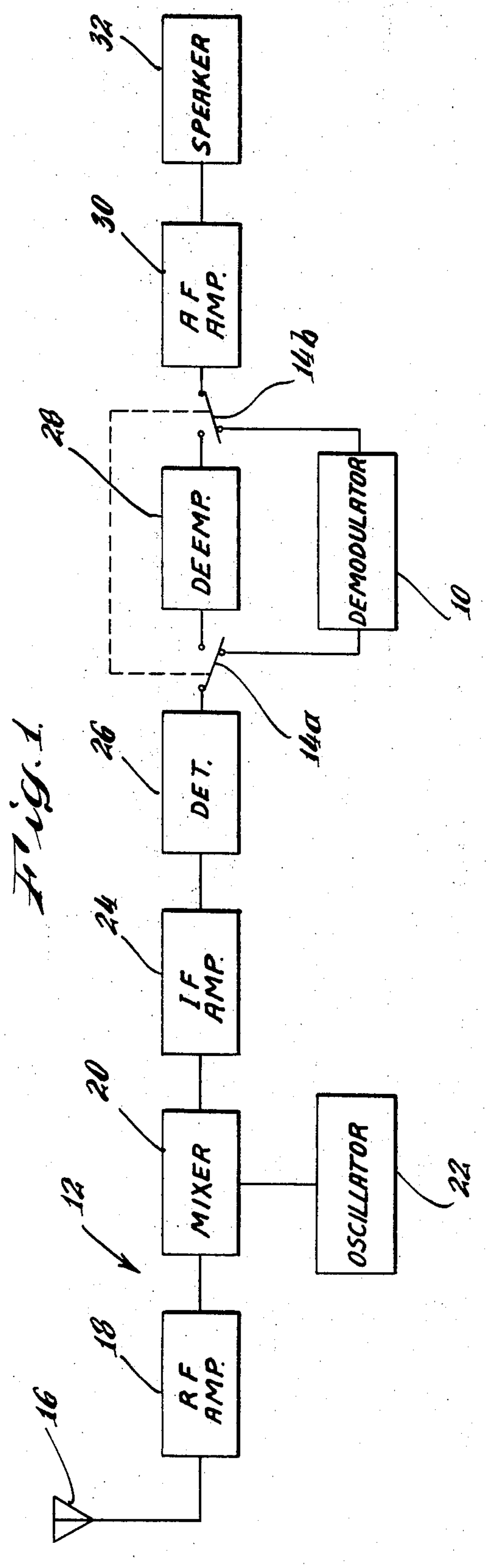
FIG. 1 is a block diagram of an FM receiver showing the manner of incorporation of my invention therein.

Referring now to FIG. 1, the demodulator, constructed according to the invention and indicated generally at 10, is selectively connected into a conventional superhetrodyne FM receiver circuit, generally indicated at 12, by a pair of ganged switches 14*a* and 14*b*. The receiver 12 includes antenna 16, RF amplifier 18, mixer 20, oscillator 22, IF amplifier secton 24, FM detector 26, deemphasis network 28, audio amplifier 30, and speaker 32. The receiver 12 functions in well-known, conventional fashion when switches 14*a*, 14*b* are in positions opposite from that shown in FIG. 1. However, with the switches 14*a*, 14*b* in the positions shown, the demodulator 10 is effectively substituted into the receiver 12 between detector 26 and audio amplifier 30 in place of deemphasis network 28.

Figure 3:
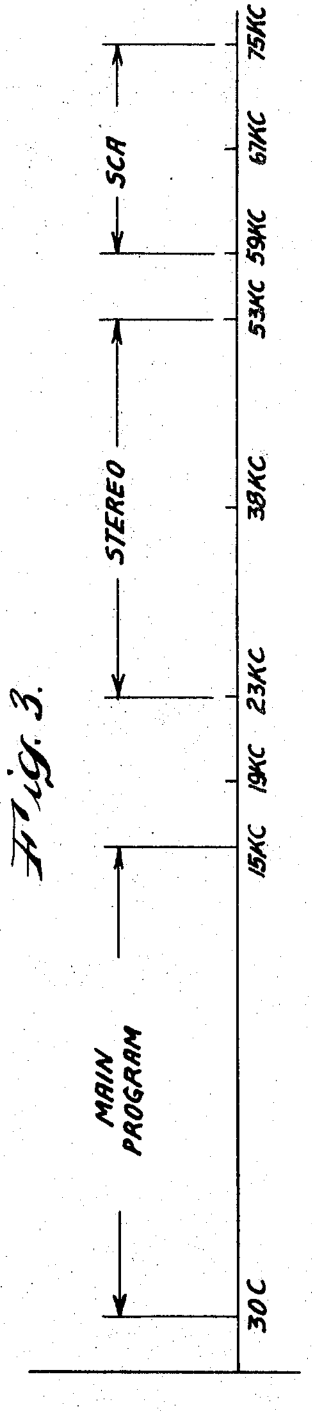
FIG. 3 is a diagram of a sideband frequency spectrum illustrating the application of my invention.

To better appreciate the function of the receiver 12 with demodulator 10 incorporated therein, reference is has to FIG. 3 which shows a sideband frequency spectrum of an FM broadcast channel. This sideband spectrum represents the intelligence being broadcast. Thus, this intelligence is impressed on the FM modulator of the transmitter and appears at the output of the detector 26 (FIG. 1).

Each FM broadcast station is allotted a frequency band 200 kc. wide included in the overall FM broadcast spectrum between 88 mc. and 108 mc. Frequency deviation is limited to 75 kc. on either side of the carrier frequency. Two guard bands of 25 kc. account for the remainder of the 200 kc. station bandwidth.

Thus, in FIG. 3, the sideband frequency spectrum for intelligence runs from 75 to 75 kc. on each side of the carrier frequency. With a deviation ratio of one to one, the frequency range from 30 c. to 15 kc. corresponds to the audiofrequency range and would constitute the main program intelligence being broadcast by an FM station. Beyond 15 kc. is a pilot frequency of 19 kc. which is used to develop stereo in the form of a double sideband centered around a 38 kc. subcarrier. Each stereo sideband is 15 kc. and thus the two together extend from 23 kc. to 53 kc., as shown in FIG. 3. It will be appreciated that all FM stations do not broadcast stereo, and my invention is not dependent on the presence thereof.

The intelligence to which the present invention is concerned in the illustrated situation of FIG. 3 is a double sideband subcarrier centered around 67 kc. with a modulation deviation of ±8 kc. This intelligence is impressed as FM on the FM modulator of the transmitter, and is broadcast as frequency modulation of a frequency modulated carrier. Consequently, at the output of the detector 26, this intelligence is represented as FM while the main program and the stereo intelligence is converted to audiofrequency. The FM intelligence centered about 67 kc. has been termed SCA for Subsidiary Carrier Authorization.

The demodulator 10 of the present invention is particularly adapted to demodulate SCA broadcasts. It should be understood that while the SCA broadcast is centered around 67 kc. in the instant description, this need not always be the case. As to those FM stations not broadcasting stereo, the SCA broadcast may be centered on a lower frequency subcarrier such as, for example, 24 kc. Accordingly my invention is adapted to handle subcarriers at least in the range from 24 kc. to 67 kc.

Referring now to a detailed description of my invention, the demodulator 10 includes active band-pass filter stages 40 and 42, a ratio detector 44, and a deemphasis network 46. The signal input to the filer stage 40 of the demodulator 10 is applied to an input terminal 48 from the output of the detector 26, which the switch 14*a* is in the position shown in FIG. 1. The input terminal 48 is connected to the base of a transistor Q1 through a resistor R1 and capacitor C2. The junction between resistor R1 and capacitor C2 is coupled to ground through a capacitor C1. Resistor R1 provides a measure of isolation between the demodulator 10 and the detector 26 (FIG. 1) and contributes to a high input impedance. Capacitor C2 is designed to offer high attenuation to audiofrequency signal components in the output of the detector 26 (FIG. 1), i.e., the main program AM intelligence (FIG. 3). By the same token, capacitor C2 produces very little attenuation for intelligence in the frequency range of interest i.e., from 24 kc. to 75 kc. Capacitor C1 is designed to bypass all signals above the frequency range of interest, and thus helps to suppress adjacent channel interference which may be in the composite input signal.

The base of transistor Q1 is connected to a positive supply voltage on buss 50 through resistor R2 and to ground through a resistor R3. These two resistors provide a voltage divider network for establishing class A forward bias for transistor Q1. The emitter of transistor Q1 is connected to ground through a resistor R4, which is bypassed by a capacitor C3. Resistor R4 provides self-bias for transistor Q1, while capacitor C3 provides incomplete emitter bypass at audiofrequencies but not for frequencies above the audiofrequency range. Thus, transistor Q1 provides gain for signals in the frequency range of interest but not for lower frequency signals.

The collector of transistor Q1 is connected through the parallel combination of capacitor C4 and an inductor L1 to buss 50. Inductor L1 constitutes the primary winding of a transformer, generally indicated at X1, while inductor L2 constitutes a secondary winding thereof. A capacitor C5 is connected across inductor L2.

Capacitor C4 and inductor L1 in combination with capacitor C5 and inductor L2 form a stagger-tuned, magnetically coupled band-pass filter of approximately 16 kilocycles centered about the frequency of interest, which in the illustrated embodiment is 67 kc. (FIG. 3). The inductors L1 and L2 preferably have ferrite cores so as to provide high circuit Q and small physical size.

Still referring to FIG. 3, one side of the tank circuit formed by inductor L2 and capacitor C5 is connected to ground while the other side is coupled through a capacitor C6 to the base of a transistor Q2. The base of transistor Q2 is connected to buss 50 through resistor R5 and to ground through resistor R6. These two resistors provide a voltage divider network establishing class A forward bias for transistor Q2. The emitter of transistor Q2 is connected to ground through resistor R7, which is bypassed by capacitor C8. This capacitor provides incomplete emitter bypass or degenerative feedback at audiofrequencies, but does provide emitter bypass and thus greater gain for signals in the frequency range of interest.

The collector of transistor Q2 is connected to one side of a parallel circuit combination consisting of an inductor L3, a capacitor C7, and a resistor R8. Capacitor C7 shown connected between resistor R8 and the base of transistor Q2, is an optional element which may be required to suppress oscillation should the stray capacitance in a particular unit be excessive.

Inductor L3 constitutes the primary winding of a radiofrequency transformer, generally indicated at X2, Inductors L4 and L5 are the secondary windings thereof. Inductors L3, L4 and L5 have ferrite cores so as to provide high Q and small size. However, resistor R8 is connected across inductor L3 in order to lower the Q of this resonant tank circuit and thus widen its band-pass filter characteristics. Capacitor C10, which is connected across inductor L4, is selected so as to provide therewith a tank circuit whose resonant frequency is the desired center frequency, i.e., 67 kc. in the illustrated embodiment. Similarly, capacitor C9 is selected to resonate with inductor L3 at the desired center frequency.

The upper end of inductor L4 is connected through a diode D1 and a resistor R11 to one side of an RC circuit consisting of resistor R14 shunted by a capacitor C14. The lower side of inductor L4 is connected through diode D2 and resistor R12 to the other side of this RC circuit. The junction between resistor R11 and the RC circuit is grounded. A center tap of inductor L4 is connected though an inductor L5, a resistor R9 and a capacitor C11 to ground. These above-enumerated elements comprise the ratio detector 46.

By virtue of the inductive coupling between inductors L3, L4 and L5 of the radiofrequency transformer X2, voltages are induced in the inductors L4 and L5 which are effective to produce RF currents through diodes D1 and D2. The current through diode D1 flows from its cathode through the upper portion of inductor L4, inductor L5, resistor R9 and capacitor C11 to ground, and returns through resistor R11 to the anode of diode D1. The current through diode D2 flows from its cathode through the RC network to ground and returns through capacitor C11, resistor R9, inductor L5, and the lower half of inductor L5 to the anode of diode D2. It is thus seen that the separate diode currents flow in opposite directions through capacitor C11. If the incoming signal is at the center frequency, i.e., the resonant frequency of the tank circuits associated with transformer X2, the current flowing through diodes D1 and D2 are of equal magnitude and flow in opposite directions through capacitor C11. Thus, the voltage across capacitor C11 is zero. When the incoming signal frequency differs from the center frequency, the currents flowing through diodes D1 and D2 are of unequal magnitudes, and a potential drop is developed across capacitor C11. The value of this potential drop is proportional to the amount of difference between the instantaneous frequency of the incoming signal and the center frequency. Since the input signal is frequency modulated, and the amount of frequency deviation on either side of the center frequency and the rate of deviation are determined by the amplitude and frequency of the audio modulating signal, the voltage drop across capacitor C11 will vary in accordance with this audio modulating signal. As a consequence, the FM modulated signal detected by ratio detector 44 is converted into an audiofrequency voltage as developed across capacitor C11.

Resistors R11 and R12 are included in the ratio detector circuit 44 so as to closely match the forward conductance of diodes D1 and D2. The RC network consisting of resistor R14 and capacitor C14 is selected to have a long time constant, thus rendering the detector insensitive to amplitude variations in the incoming signal.

The deemphasis network 46 consists of a resistor R10 connected to the junction between resistor R9 and capacitor C11 of ratio detector 44. The other end of resistor R10 is connected to ground through capacitor C12. A resistor R13 is connected across capacitor C12 to serve as the load resistor for the ratio detector 44. The upper end of resistor R13 is coupled through a capacitor C13 to an output terminal 50 of the demodulator 40. Capacitor C13 provides DC isolation, but audiofrequency coupling to the AF amplifier 30 through switch 14*b* (FIG. 1).

Figure 5:
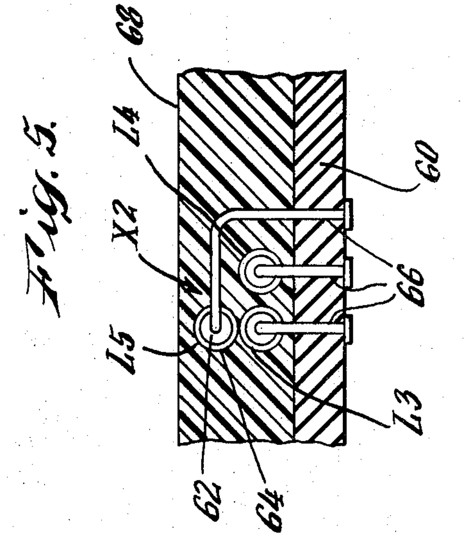
FIG. 5 is a sectional view of a portion of a circuit board showing the preferred manner of mounting the primary and secondary coils of another of the transformers in the circuit of FIG. 2.
Figure 4:
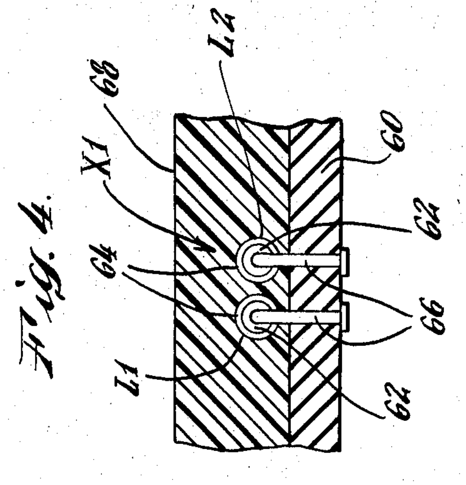
FIG. 4 is a sectional view of a portion of a circuit board showing the preferred manner of mounting the primary and secondary coils of one of the transformers in the circuit of FIG. 2.

Referring now to FIGS. 4 and 5, the ferrite core inductors forming RF transformers X1 and X2 are shown mounted to a printed circuit board 60. As seen in FIG. 4, inductors L1 and L2 of transformers X1 each have ferrite cores 62 carrying windings 64. A wire 66 of relatively heavy gauge is secured to each end of the cores 62 and extends downwardly through a hole in the circuit board 60 where its end is electrically connected by solder to the printed circuit carried on the underside of the board. The wires 66 serve as yieldable mountings for the inductors and as electrical leads for windings 64; the ends of the windings being electrically connected thereto.

Figure 2:
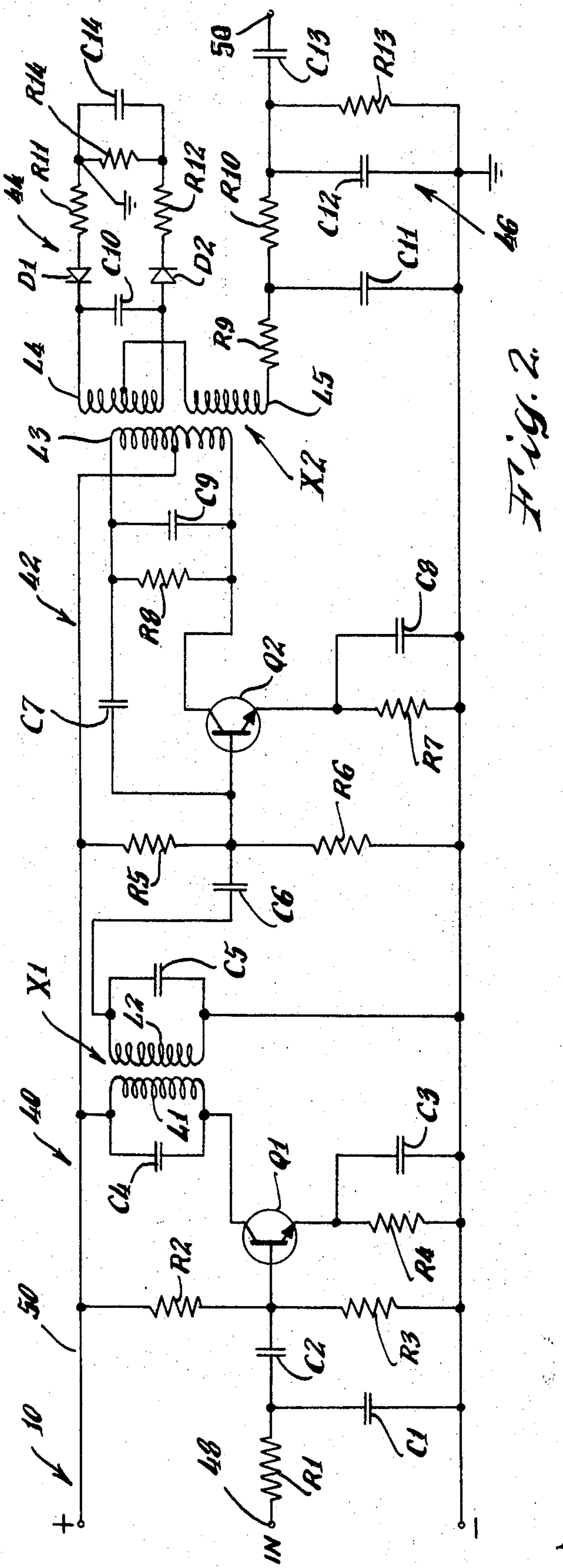
FIG. 2 is a detailed circuit diagram of a demodulator constructed according to a preferred embodiment of my invention.

After all of the circuit elements of FIG. 2 have been mounted on the circuit board 60, it is necessary to adjust the transformer X1 to the desired frequency bandwidth. This is done by manually adjusting the spacing between inductors L1 and L2 to thereby vary the air coupling therebetween and thus the mutual inductances thereof. This adjustment is facilitated by the yieldable character of mounting wires 66. After the coupling of transformer X1 has been established by adjustment of the spacing therebetween, this spacing is preserved by potting the entire transformer in epoxy 68, as shown in FIG. 4.

It will be observed that the inductors L1 and L2 of transformer X1 are arranged in horizontal relation to each other, rather than vertically as has been done in the past. By virtue of this horizontal relationship, less space above the circuit board 60 is required to accommodate transformer X1. This contributes to the low profile of my demodulator module.

Transformer X2 is similarly mounted as seen in FIG. 5. The inductors L3, L4 and L5 thereof are mounted by wires 66 which serve as leads for windings 64. Since inductor L5 is not part of a tuned circuit, it may rest on inductor L3, but is electrically insulated therefrom by a suitable material such as glue. The appropriate coupling of transformer X2 is achieved by adjusting the spacing between inductors L3 and L4, and the established spacing is preserved by epoxy 68.

It will be appreciated that the profile of transformer X2, as shown in FIG. 5 could be considerably reduced by arranging inductor 65 on the opposite side of inductor L3 from inductor L4. However, the arrangement shown is more than satisfactory since various capacitors in the circuit have an effective height at least as great as the vertical space occupied by inductors L3 and L5.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. An FM demodulator adapted for selective connection to the detector output of an FM receiver and operable to demodulate an FM subcarrier above the audiofrequency range appearing thereat, said demodulator comprising, in combination:

A. an input terminal for connection to the detector output of an FM receiver;
B. a first amplifier connected to said input terminal;
C. a second amplifier;
D. a first RF transformer having:
  1. a primary winding connected to said first amplifier, and
  2. a secondary winding connected to said second amplifier;
E. capacitors connected in circuit with said primary and secondary windings of said first RF transformer to form a stagger-tuned, magnetically coupled band-pass filter having a center pass frequency corresponding to the frequency of the FM subcarrier;
F. a second RF transformer having:
  1. a primary winding tuned to the FM subcarrier frequency and connected to said second amplifier, and
  2. a secondary winding tuned to the FM subcarrier frequency;
G. FM detection means connected in circuit with said secondary winding of said second RF transformer; and
H. an output terminal connected to said FM detection means and adapted for connection to the audio section of the FM receiver.

2. The demodulator defined in claim 1 which further includes switching means for connecting said input terminal to the detector output and said output terminal to the audio section of the FM receiver.

3. The demodulator defined in claim 1 wherein the windings of said first and second RF transformers are ferrite core inductors.

4. The combination defined in claim 3 which further includes:

A. a printed circuit board mounting the circuit components thereof;
  1. the primary and secondary windings of each said transformer being arranged in horizontal, spaced relation to each other, and
  2. the spacing therebetween being manually adjustable to vary the magnetic coupling therebetween.

5. The combination defined in clam 4, and epoxy encasing said transformers to preserve the established spacing between said primary and secondary windings thereof.

6. The combination defined in claim 4 wherein said FM detector is a ratio detector which includes an inductor disposed in closely spaced, insulated relation to said primary winding of said second transformer and tightly magnetically coupled thereto.

7. The demodulator defined in claim 1 wherein said FM detector is a ratio detector.

8. The demodulator defined in claim 1 wherein said first and second amplifiers are transistors, said transistors being provided with incomplete emitter bypassing at audiofrequencies to reduce transistor gain for audiofrequency signals.

9. The demodulator defined in claim 1 wherein said band-pass filter has a center pass frequency in the range from 24 kc. to δ kc.

10. The demodulator defined in claim 9 wherein said band-pass filter has a bandwidth of ±8 kc. about its center pass frequency.